United States Patent [19]

Friedline

[11] Patent Number: 4,779,914
[45] Date of Patent: Oct. 25, 1988

[54] DISPLAY AND CARRYING RACK FOR FISHING EQUIPMENT

[76] Inventor: Robert W. Friedline, 318 Albers Pl., Bethalto, Ill. 62010

[21] Appl. No.: 83,362

[22] Filed: Aug. 10, 1987

[51] Int. Cl.[4] .................. A01K 97/10; A47F 7/00; B65D 71/00
[52] U.S. Cl. .................. 294/143; 211/70.8; 211/198; 294/146; 294/161; 294/169
[58] Field of Search .................. 294/137, 141–143, 294/146, 148, 159–163, 169; 43/21.2; 206/315.2, 315.11, 443; 211/60.1, 63, 64, 68, 70.2, 70.5, 70.8, 89, 104, 113, 198, 118; 224/922; 280/DIG. 6

[56] References Cited

U.S. PATENT DOCUMENTS

| | | | |
|---|---|---|---|
| 886,116 | 4/1908 | Custer | 211/198 X |
| 3,487,947 | 1/1970 | Bogar | 211/70.8 |
| 3,889,860 | 6/1975 | Lindsey | 294/143 |
| 4,014,466 | 3/1977 | Wess et al. | 294/162 |
| 4,036,416 | 7/1977 | Lowe | 294/146 X |
| 4,193,495 | 3/1980 | Keeley | 294/143 |
| 4,526,414 | 7/1985 | Jones | 294/143 |
| 4,666,038 | 5/1987 | Minneman | 211/198 X |

Primary Examiner—Johnny D. Cherry
Attorney, Agent, or Firm—Senniger, Powers, Leavitt and Roedel

[57] ABSTRACT

A rack for carrying and displaying fishing equipment, such as fishing rods. The rack comprises at least two pivotably interconnected frame sections adapted for holding fishing rods, each having opposite sides and opposite ends. The frame sections are pivoted adjacent one of their ends, constituting their inner ends, for pivotal movement on an axis extending in side-to-side direction with respect to the frame sections between a carrying configuration for carrying the fishing rods wherein the frame sections are positioned in different planes and the outer ends of the frame sections are spaced apart, and a display configuration for displaying the fishing rods on a wall wherein the frame sections are generally coplanar and the rack is adapted to be removably mounted on the wall. A handle is provided adjacent the inner ends of the frame sections for carrying the rack, and a mechanism is provided for locking the frame sections in the carrying configuration.

15 Claims, 3 Drawing Sheets

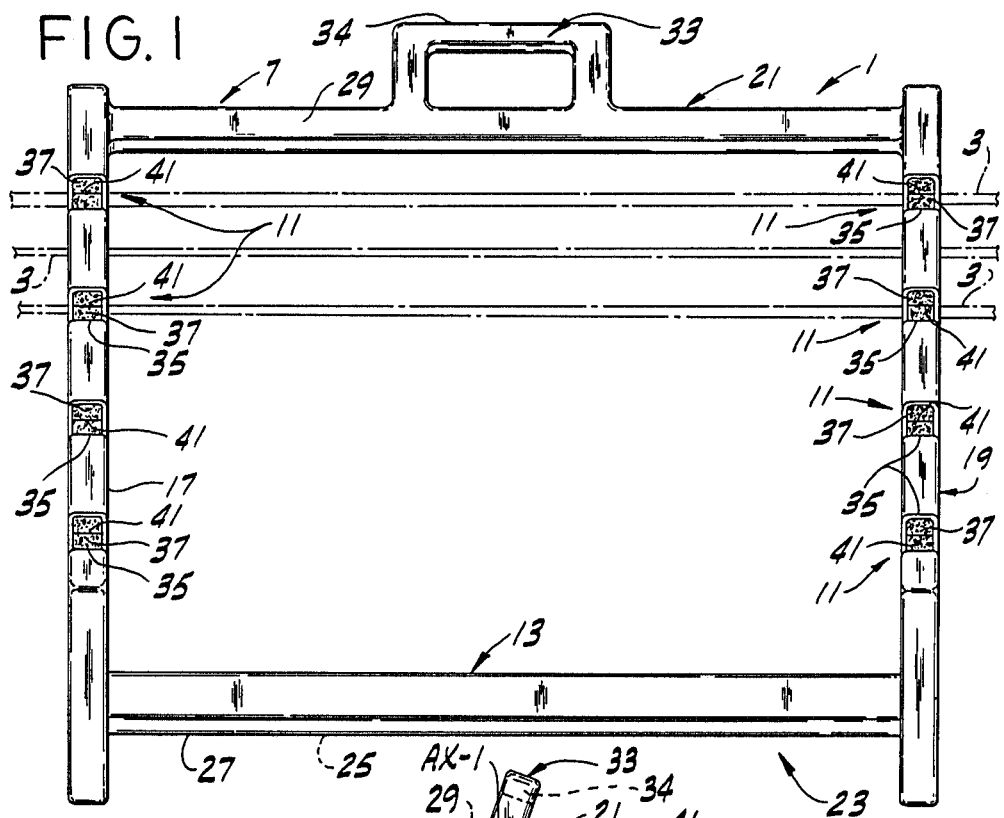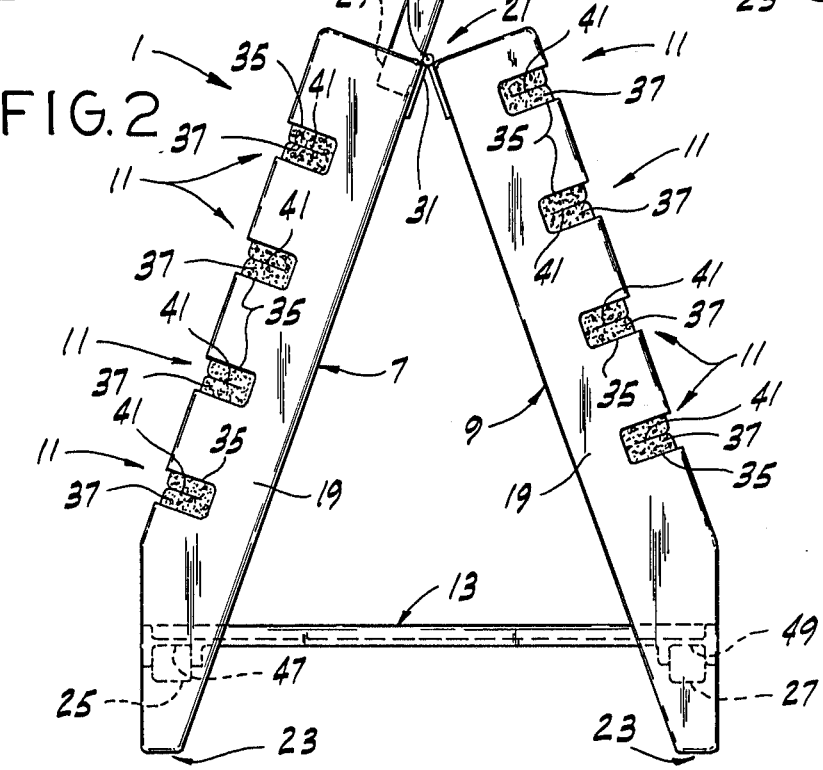

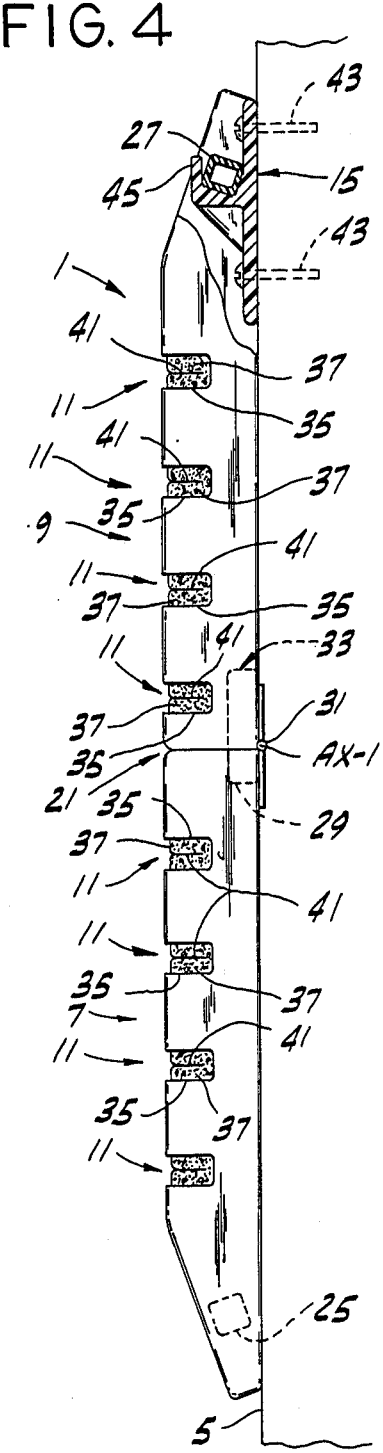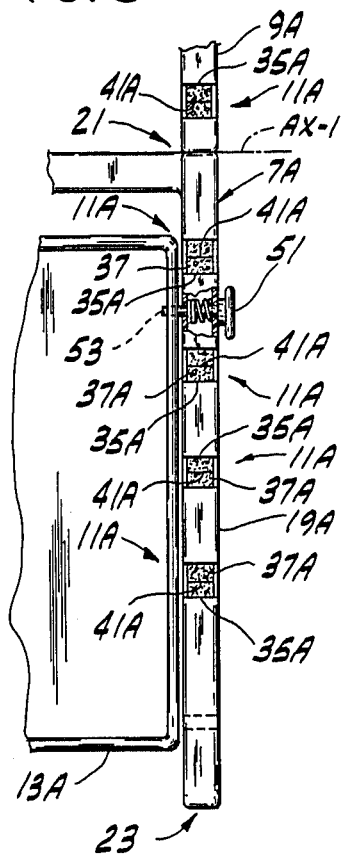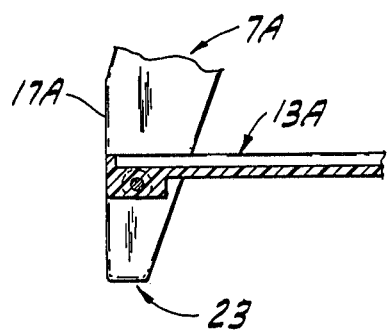

DISPLAY AND CARRYING RACK FOR FISHING EQUIPMENT

BACKGROUND OF THE INVENTION

This invention relates generally to racks for carrying fishing equipment, such as fishing rods, and racks for displaying fishing rods, and more particularly to such a rack adapted for both carrying and displaying fishing equipment.

Various racks have been used for holding and carrying fishing equipment, including fishing rods and tackle boxes, from cars or trucks to a lake or river. U.S. Pat. No. 3,889,860 and U.S. Design Pat. No. 261,571 disclose racks which are useful for carrying fishing rods, etc. However, these racks are not suitable for displaying and/or efficiently storing fishing rods, for example, in a game room or garage when not fishing. Other racks, such as disclosed in U.S. Design Pat. No. 272,785, are designed for displaying fishing equipment on a wall, but not for transporting fishing equipment. Accordingly, one problem with prior art fishing equipment racks is that one type of rack is required for transporting fishing equipment and another type of rack is required for storing and/or displaying the fishing equipment.

SUMMARY OF THE INVENTION

Among the several objects of the invention may be noted the provision of a rack adapted for both carrying and displaying fishing equipment, such as fishing rods and a tackle box; the provision of such a rack which may be readily converted between carrying and displaying configurations; the provision of such a rack which is adapted for displaying fishing rods on a wall; the provision of such a rack which is durable and easy-to-use; and the provision of such a rack which is inexpensive to manufacture.

Generally, a rack of the present invention is useful for carrying and displaying fishing equipment, such as fishing rods. The rack comprises at least two pivotably interconnected frame sections, each frame section having opposite sides and opposite ends. The frame sections are pivoted adjacent one of their ends, constituting their inner ends, for pivotal movement on an axis extending in side-to-side direction with respect to the frame sections between a carrying configuration for carrying the fishing rods wherein the frame sections are positioned in different planes and the outer ends of the frame sections are spaced apart, and a display configuration for displaying the fishing rods on a wall wherein the frame sections are generally coplanar and the rack is adapted to be removably mounted on the wall. Handle means is provided adjacent the inner ends of the frame sections for carrying the rack, and means is provided on the frame sections for holding the fishing rods. Means is provided for locking the frame sections in the carrying configuration.

Other objects and features will be in part apparent and in part pointed out hereinafter.

BRIEF DESCRIPTION OF THE DRAWINGS

FIG. 1 is a front elevation of a rack of the present invention in its carrying configuration;

FIG. 2 is a side elevation of the rack of FIG. 1;

FIG. 4 is a side elevation of the rack of FIG. 1-3;

FIG. 5 is partial front elevation of another embodiment of the rack of the present invention in its display configuration; and FIG. 6 is a partial cross sectional view of a portion of the rack of FIG. 5 in its carrying configuration, showing a platform pivoted to a generally horizontal position.

Corresponding reference characters indicate corresponding parts throughout the several views of the drawings.

DESCRIPTION OF PREFERRED EMBODIMENT

Figure 3:
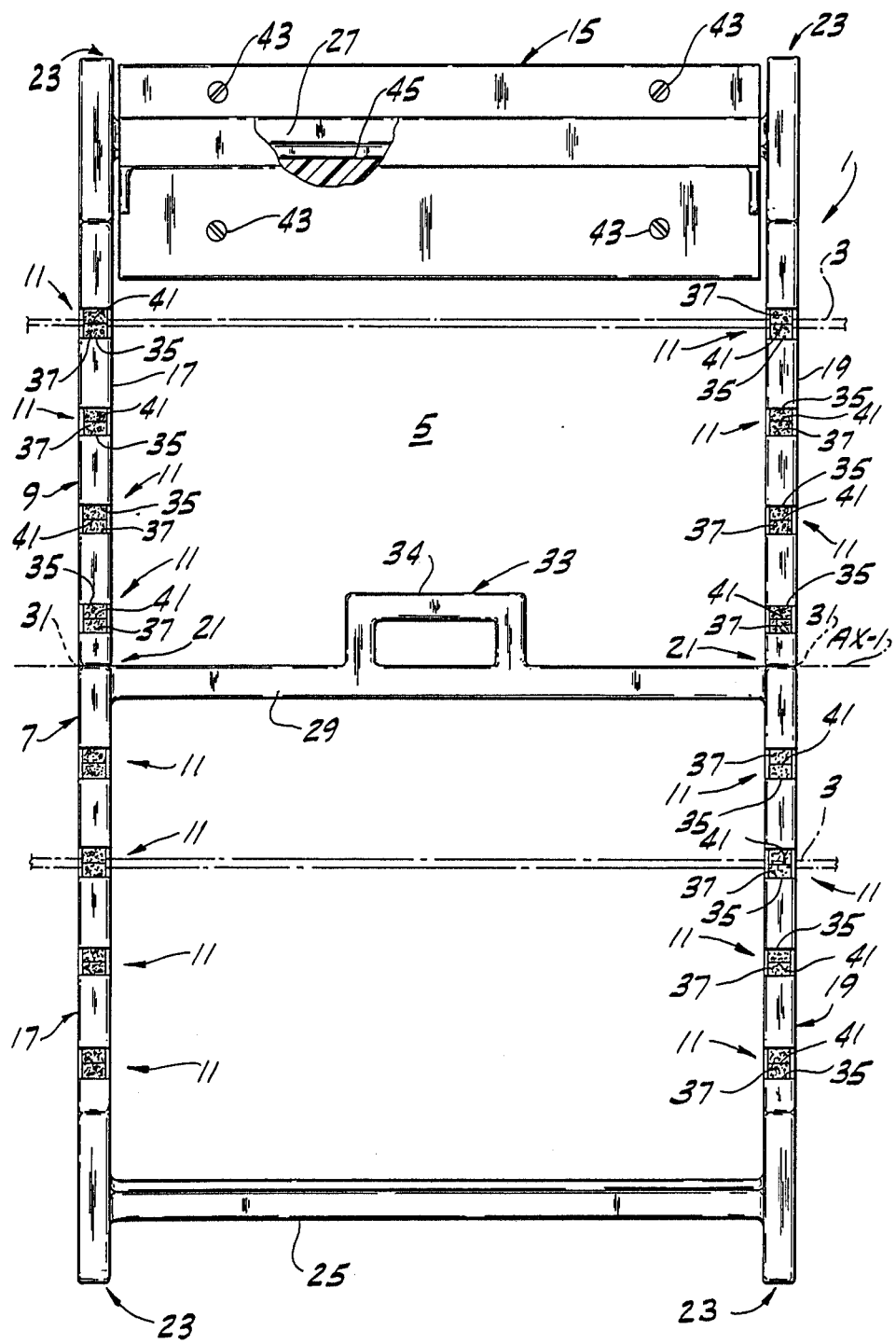
FIG. 3 is a front elevation of the rack in its display configuration.

Referring now to the drawings, a rack of the present invention is designated in its entirety by reference numeral 1. As illustrated in FIGS. 1 and 2, rack 1 has a generally A-shaped carrying configuration for carrying fishing equipment, such as fishing rods (e.g., fishing rod sections 3) and a tackle box (not shown). The rack 1 may be converted from its carrying configuration to a generally flat or planar display configuration shown in FIGS. 3 and 4 for displaying the fishing rods 3 on a wall 5.

The rack 1 generally comprises two pivotably interconnected frame sections generally designated 7 and 9, means generally designated 11 on the frame sections for holding the fishing rods 3, and means (e.g., platform 13) for locking the frame sections in its carrying configuration. The rack 1 may be molded, for example, of an aesthetically pleasing synthetic resin material or built of suitable hardwood, such as oak. A hanger 15 (FIGS. 3 and 4) is provided for hanging the rack 1 on the wall 5 in its display configuration.

Each frame section 7, 9 has opposite sides 17, 19 and opposite ends (e.g., inner and outer ends 21 and 23), and comprises two generally parallel side frame members at 17 and 19 interconnected by at least one cross frame member (e.g., cross frame members 25 and 27) running generally perpendicular to the side frame members. In addition to cross frame member 25, constituting an outer cross frame member, frame section 7 preferably has an inner cross frame member 29 spaced from and generally parallel to the outer cross frame member. The frame sections 7, 9 may be integrally molded of synthetic resin material or, alternatively, the cross frame members 25, 27, 29 may be rigidly interconnected to the side frame members 17 and 19 via dovetail joints.

The cross frame members 25, 27 and 29 preferably have generally square or rectangular shaped cross sections (see FIG. 2). In the case of the outer or lower cross frame members 25 and 27, the sides of the square or rectangular cross-sections are skewed with respect to the plane of the respective frame section 7 or 9 so that upper or inner sides of the cross frame members are adapted to be positioned generally parallel to the surface of the ground when the rack 1 is in its A-shaped configuration and set on the ground.

The frame sections 7 and 9 are interconnected at their inner ends 21, 21 by two hinges 31 (e.g., of the same general type as door hinges) mounted on the inner ends of the side frame members 17, 19 with the pivot axis AX-1 of the hinges running in side-to-side direction with respect to the frame sections 7, 9 of the rack 1 along the inner ends 21 of the frame sections. The hinges 31 allow the frame sections 7 and 9 to pivot relative to each other between the A-shaped or inverted V-shaped configuration (FIGS. 1 and 2), and the generally planar configuration (FIGS. 3 and 4) wherein the inner ends of respective side frame members 17, 19 are face-to-face together and the respective side frame members are colinear.

Handle means (e.g., a handle 33) for carrying the rack 1 is mounted on or integrally molded with the inner cross frame member 29 along a mid-portion of the cross frame member. The handle 33 extends upwardly (FIGS. 1 and 2) from the inner end 21 of frame section 7 in the plane of frame section so that the handle lies in the plane of the rack 1 when the rack is in its planar or display configuration. When the rack 1 is in its A-shaped carrying configuration and the platform 13 is horizontal, the handle's cross or horizontal portion 34 is positioned substantially directly over the rack's center of gravity so that the platform is suspended in a generally horizontal position when the rack is held by the handle. The horizontal portion 34 of the handle 33 preferably has a generally square-shaped cross section with a gently rounded lower surface.

Holding means 11 comprises a plurality of pairs of notches 35 (e.g., four pairs) spaced at intervals along the side frame members 17 and 19 of each frame section 7,9, each pair of notches having resilient material 37 therein adapted for gripping a fishing rod 3 and holding it to extend generally in side-to-side direction with respect to a respective frame section. More specifically, the resilient material 37 may comprise a relatively rigid yet cushioning foam having a slit 41 therein for slidably receiving a rod 3 without abrading it.

The hanger 15 is adapted for receiving a plurality of fasteners, e.g., screws 43, to mount the hanger on the wall 5, and comprises a bracket member 45 adapted for supporting one of the cross frame members, e.g., cross frame member 27, to hang the rack 1 on the wall. The bracket member 45 preferably has a shape that is complementary to the cross section of the cross frame member 27 so that the cross frame member is snugly held in the groove.

The platform 13 is preferably adapted for supporting a tackle box (not shown) on the frame sections 7, 9 when the rack 1 is in its carrying configuration. The platform 13 has two channels 47 and 49 (FIG. 2) running continuously along its sides generally parallel to the sides. The channels 47, 49 are adapted for receiving the cross frame members 25 and 27, respectively, so that the platform 13 may be attached to the frame sections 7, 9 in a generally horizontal position spanning the frame sections generally adjacent the outer ends 23 of the frame sections. More specifically, the shapes and sizes of the channels 47, 49 and cross frame members 25, 27 are preferably complementary (e.g., complementary square or rectangular cross sections) so that cross frame members are snugly received in the channels to support the platform on the cross frame members and securely hold the frame sections 7, 9 in the inverted V-shaped configuration.

FIGS. 5 and 6 depict an alternative platform construction 13A wherein the platform is pivotably connected to frame section 7A and removably attachable to a cross frame section (similar to cross frame member 27) of the other frame section (similar to frame section 9). A spring-loaded pin 51 is provided in side frame member 19A of frame section 7A, and a hole 53 is formed in the platform 13A for receiving the pin to hold the platform 13A in the plane of the frame section (i.e., extending upwardly from its pivot axis in a generally vertical plane) when the rack is in its display configuration.

It will be observed that the frame sections 7, 9 are readily pivoted on the pivot axis AX-1 of the hinges 31 between the carrying configuration (FIGS. 1 and 2) wherein the frame sections 7, 9 are positioned in different planes and the outer ends 23 of the frame sections are spaced apart, and a display configuration (FIGS. 3 and 4) wherein the frame sections are generally coplanar and the rack 1 is adapted to be removably mounted on the wall 5.

In addition, it will be observed that, when the rack 1 is in its carrying configuration, the frame sections 7 and 9 form a structure of generally inverted V-shape or, in combination with the locking means 13, a generally A-shaped structure (see FIG. 2).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rack for carrying and displaying fishing equipment, such as fishing rods, comprising:
    at least two pivotably interconnected frame sections, each having opposite sides and opposite ends, said frame sections being pivoted adjacent one of their ends, constituting their inner ends, for pivotal movement on an axis extending in side-to-side direction with respect to the frame sections between a carrying configuration for carrying the fishing rods wherein the frame sections are positioned in different planes and the outer ends of the frame sections are spaced apart, and a display configuration for displaying the fishing rods on a wall wherein the frame sections are generally coplanar and the rack is adapted to be removably mounted on the wall;
    handle means adjacent said inner ends of the frame sections for carrying the rack;
    means on the frame sections for holding the fishing rods; and
    means for locking the frame sections in said carrying configuration.

2. A rack as set forth in claim 1 wherein said locking means includes means for supporting a tackle box or the like on the frame sections when the rack is in its carrying configuration.

3. A rack as set forth in claim 2 wherein said means for supporting a tackle box comprises a platform attachable to the frame sections in a generally horizontal position spanning the frame sections generally adjacent the outer ends thereof.

4. A rack as set forth in claim 2 wherein said means for supporting a tackle box comprises a platform pivotably connected to one frame section and removably attachable to the other frame section.

5. A rack as set forth in claim 2 wherein each frame section comprises two generally parallel side frame members interconnected by at least one cross frame member.

6. A rack as set forth in claim 5 wherein at least one of said frame sections comprises a plurality of spaced-apart generally parallel cross frame members.

7. A rack as set forth in claim 6 wherein said handle means comprises a handle mounted on a cross frame member.

8. A rack as set forth in claim 5 wherein said frame sections form a structure of generally inverted V-shape when the rack is in its carrying configuration.

9. A rack as set forth in claim 8 wherein said frame sections and said locking means form a generally A-shaped structure when the rack is in its carrying configuration.

10. A rack as set forth in claim 5 wherein said locking means is pivotably connected to a cross frame member of one of the frame sections and removably attachable to a cross frame member of the other frame section.

11. A rack as set forth in claim 5 wherein said means for holding fishing rods comprises a plurality of pairs of notches spaced at intervals along said side frame members for holding a plurality of fishing rods extending parallel to one other in side-to-side direction with respect to the frame sections.

12. A rack as set forth in claim 5 further comprising a hanger for hanging the rack on a wall, said hanger having a bracket member for supporting a cross frame member to hang the rack on the wall.

13. A rack as set forth in claim 2 wherein said locking means is pivotably connected to one frame section and removably supportable on the other frame section.

14. A rack as set forth in claim 13 wherein said frame sections form a structure of generally inverted V-shape when the rack is in its carrying configuration.

15. A rack as set forth in claim 14 wherein said frame sections and said locking means forms a generally A-shaped structure when the rack is in its carrying configuration.

* * * * *